Jan. 10, 1967 A. M. MAROTH 3,296,880
RADIAL ROLLER ANTI-FRICTION TRANSMISSION
Filed Oct. 18, 1965 4 Sheets-Sheet 1
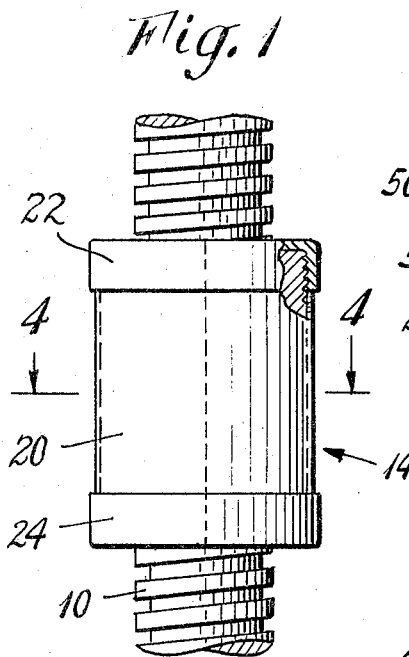
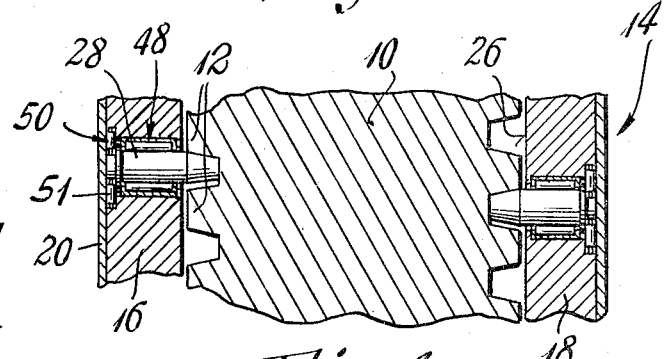
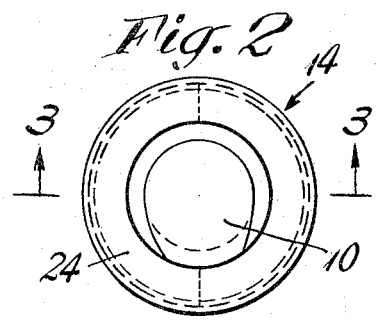
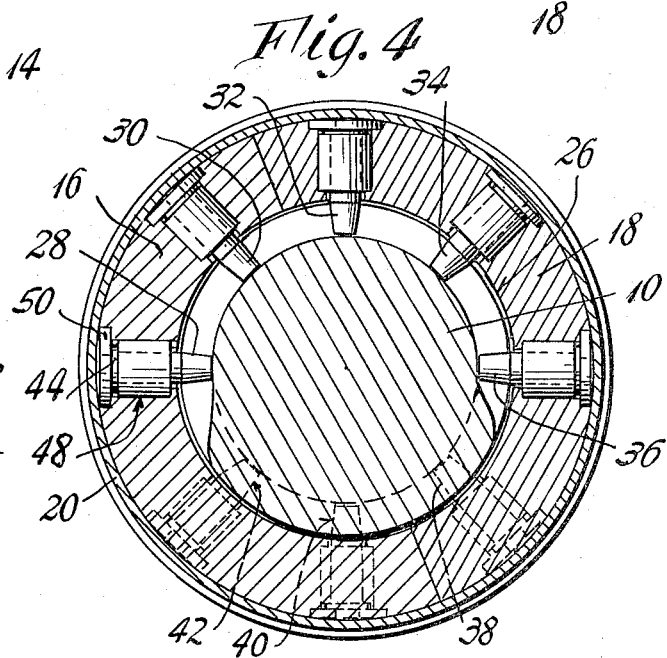
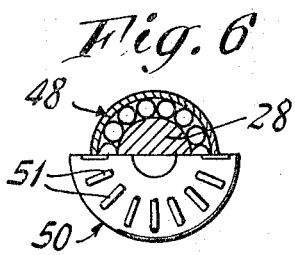
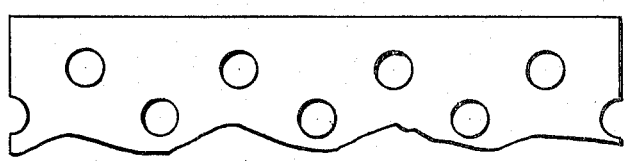
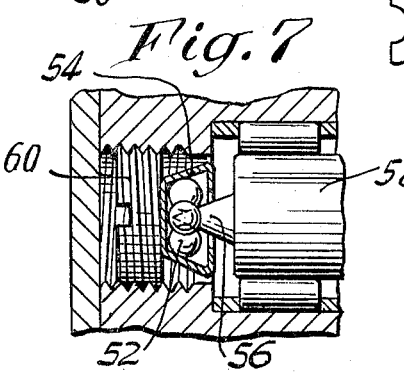
INVENTOR.
Arthur M. Maroth
BY
AGENT INVENTOR.
Arthur M. Maroth Jan. 10, 1967  A. M. MAROTH  3,296,880
RADIAL ROLLER ANTI-FRICTION TRANSMISSION
Filed Oct. 18, 1965  4 Sheets-Sheet 3
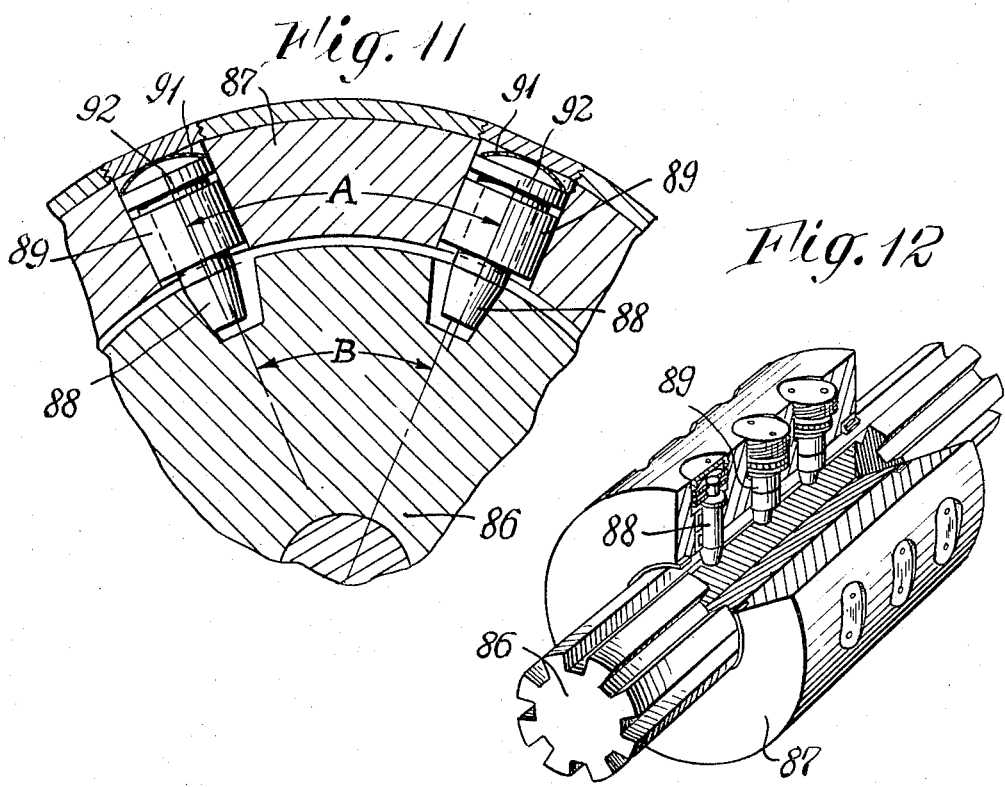
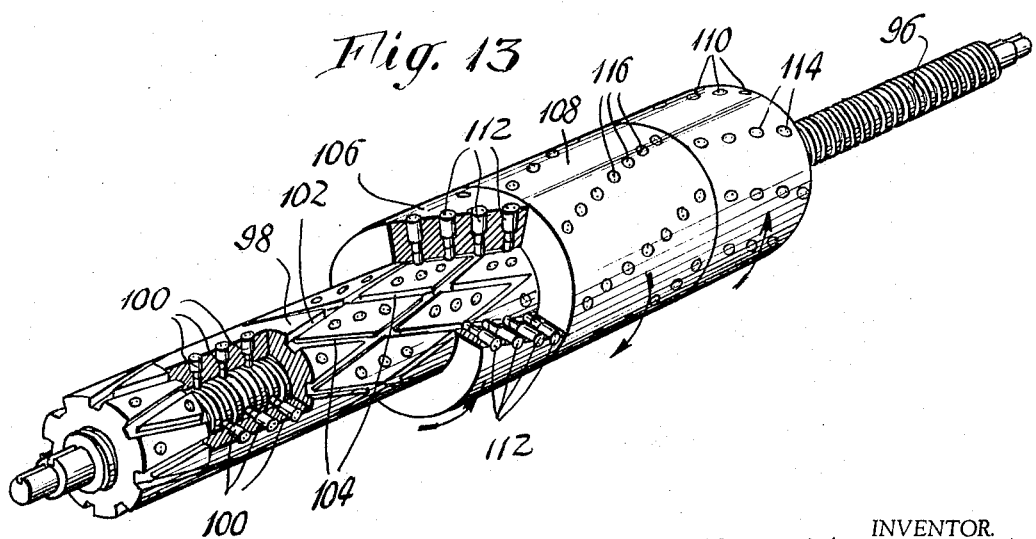
INVENTOR.
Arthur M. Maroth
BY
H. Gibner Lehmann
AGENT Jan. 10, 1967  A. M. MAROTH  3,296,880
RADIAL ROLLER ANTI-FRICTION TRANSMISSION
Filed Oct. 18, 1965  4 Sheets-Sheet 4
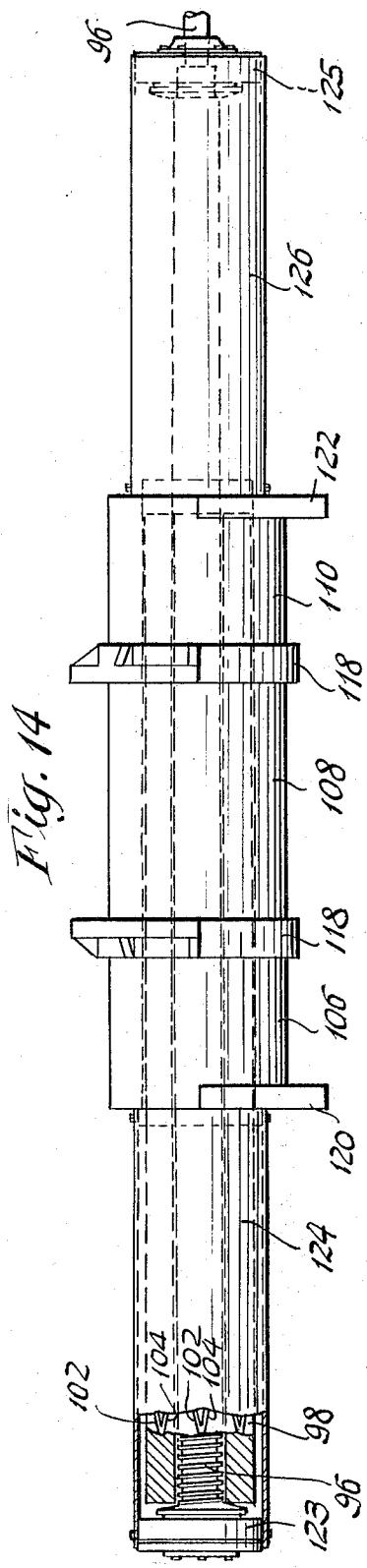
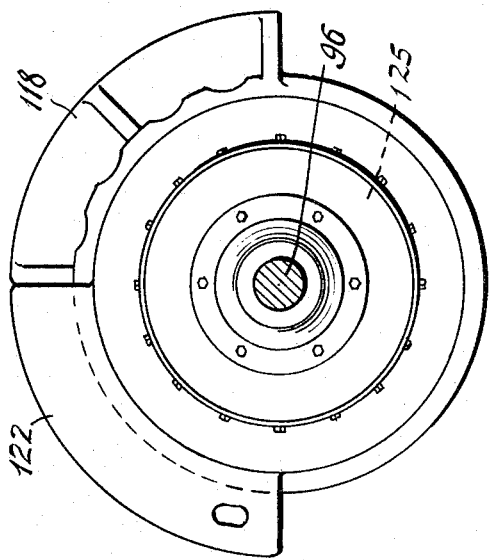
INVENTOR.
Arthur M. Maroth
BY
AGENT

United States Patent Office 3,296,880
Patented Jan. 10, 1967

3,296,880
RADIAL ROLLER ANTI-FRICTION
TRANSMISSION
Arthur M. Maroth, % Maroth Engineering Co.,
Grumman Hill Road, Wilton, Conn. 06897
Filed Oct. 18, 1965, Ser. No. 497,419
20 Claims. (Cl. 74—424.8)

This application is a continuation in part of my copending application Serial No. 428,305 filed January 27, 1965, and entitled "Radial Roller Anti-Friction Transmission."

This invention relates to mechanical transmissions, and more particularly to devices of this type which employ shouldered or threaded members.

Heretofore small drives in the form of recirculating ball screws have found widespread use where relatively light loads are involved, especially in conjunction with moderate working strokes. Such recirculating screw devices however require especially clean operating conditions, as well as very accurate fabrication of the parts. Also, by virtue of their very nature (utilizing balls) they are not adapted to handle heavy loads. Accordingly, limitations exist, with respect to such recirculating ball screws, which cannot be overcome by design refinements.

The present invention obviates the disadvantages of recirculating ball screws as above noted, and accordingly one object of the invention is to provide a novel and improved anti-friction, high efficiency transmission device of the type involving screw threaded or toothed members such as screws, gears, splines and the like, which will effectively handle loads from light and moderately heavy, up to very heavy loads without danger of failure.

Another object of the invention is to provide an improved high efficiency, low friction transmission as above set forth, which has relatively few parts or components, and which may be constructed in a simple manner.

Yet another object of the invention is to provide an improved anti-friction transmission as above outlined, which may be economically fabricated and readily produced at relatively low cost.

A feature of the invention resides in the provision of an antifriction transmission as above characterized, which is relatively small in size and compact, and is especially flexible in its adaptability to various power requirements.

Another feature of the invention resides in the provision of a high efficiency low friction transmission of the kind outlined, wherein the load capacity may be increased in a simple manner, by merely increasing the number of load bearing elements of one of two cooperable members.

A further object of the invention is to provide an improved anti-friction transmission in accordance with the foregoing, wherein looseness and blacklash are eliminated, all without adding friction or reducing efficiency.

An additional feature of the invention involves maintaining the shaft part of a transmission of the character indicated, accurately centered in a cooperable sleeve part, with a minimum of friction between the said parts.

Yet another object of the invention is to provide an anti-friction transmission of the type indicated, which has automatic means for equalizing the loads on a plurality of anti-friction roller elements constituting the essential load-carrying components between main parts of the transmission, and for simultaneously eliminating the necessity for close dimensions and tolerances of one of said parts.

A still further object of the invention is to provide an improved compound-type rotary-to-rotary transmission of compact construction and high mechanical advantage, characterized by dissimilar helical elements, low friction and high efficiency.

Other features and advantages will hereinafter appear.

In the drawings accompanying this specification, similar characters of reference are used to designate like components throughout the several views, in which:

FIG. 1 is a side elevational view of the present improved antifriction transmission, illustrating one embodiment of the invention.

FIG. 2 is a top plan view of the transmission of FIG. 1.

FIG. 3 is an axial section taken on the line 3—3 of FIG. 2.

FIG. 4 is a trasverse section taken on the line 4—4 of FIG. 1.

FIG. 5 is a diagram showing a developed flat plane surface of one of the transmission parts, and indicating the location of antifriction load bearing elements carried by such parts.

FIG. 6 is a fragmentary sectional view, taken on the line 6—6 of FIG. 3.

FIG. 7 is a detail, enlarged, showing a modification of the invention, involving another form of anti-friction thrust bearing for use with the load bearing elements of the transmission and showing means for radially adjusting a roller element.

FIG. 11 is a fragmentary transverse section of a splined shaft and sleeve as provided by the invention, also having means for taking up looseness and backlash.

FIG. 12 is a perspective view, broken away, of a splined shaft and sleeve of the type shown in FIG. 11.

FIG. 13 is a perspective broken-away view of a compound mechanical reduction transmission, constituting another embodiment of the invention.

FIG. 14 is a side elevational view, partly broken away, of the transmission of FIG. 13.

FIG. 15 is an end view of the transmission of FIGS. 13 and 14.

Figure 8:
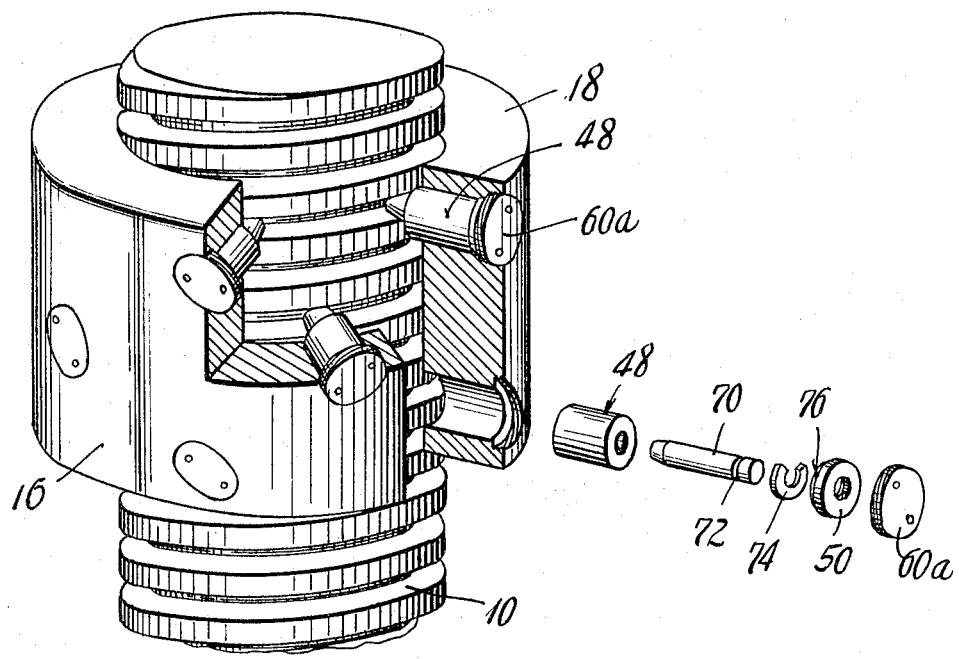
FIG. 8 is a perspective, exploded and broken away view of a transmission as provided by the invention, illustrating a slight modification thereof.

Referring now particularly to the drawings, there is shown a screw 10 which, as seen in FIG. 3, has an Acme or substantially square helical thread 12 provided on it. Hereinafter the screw 10, especially in the appended claims, is referred to as a shouldered part, the thread 12 being considered as providing projections or shoulders on said part. As will be explained later, the part 10 for certain embodiments of the invention could be in the form of a spur or spiral gear or the like, this also being considered as a shouldered part with the teeth constituting the projections thereof.

Cooperable with the screw 10, in the embodiment illustrated, is an anti-friction nut part or assemblage designated generally by the numeral 14. The nut part or assemblage 14 is here shown as being in the form of a split member, made up of two halves 16 and 18. However, it will be understood that the nut part 14 may be constituted as a single piece just as well, or may be made up of more than two parts.

In the case of the two nut halves 16, 18 a retainer sleeve 20 is provided, encircling and engaging the outer peripheral portions of the nut halves, and end caps 22 and 24 are provided, threaded on the nut halves 16, 18 and abutting the ends of the retainer sleeve 20. The caps 22, 24 and sleeve 20 illustrate one way of securing together a multiple part nut assemblage, and it will be understood that the means illustrated has advantages since but little extra space is required, since it is especially compact, and since the nut halves will be rigidly secured against relative movement and instead maintained in a precise relationship one to the other.

The nut assemblage 14 has an inner periphery 26 which is sufficiently large in diameter to somewhat loosely receive the screw 10.

In accordance with the present invention, the nut part 14 (hereinafter also referred to as a "support member") is provided with a plurality (here shown as 8 in number) of roller elements 28, 30, 32, 34, 36, 38, 40 and 42 which are disposed in sockets of the annulus, being carried by and projecting inward from the member 14 and protruding from the inner periphery 26 thereof. The roller elements 28–42 are arranged for engagement and line contact with side surfaces of the projections or screw thread portions 12 of the screw part 10, to coact therewith in the nature of a screw thread. The elements 28–42 are shown as in the form of pins having slightly tapered projecting portions arranged to fit the taper of the screw thread 12, and having head portions (such as the head 44 of the pin 28) located at the outer periphery of the annulus or nut assemblage 14, said head portions preventing inward movement of the pins from the sockets.

The sockets for the roller elements or pins 28–42 are substantially radially disposed in the nut assemblage 14 and extend between the inner and outer peripheries of such nut. The pins 28–42 are rotatable about their axes in the nut assemblage 14, and in accordance with the invention are carried by anti-friction bearing devices disposed between the roller elements and cooperable surfaces of the annular support member 14. The roller elements are thus mounted in the nut assemblage in a substantially radial disposition with respect to the annular configuration of the nut, and also disposed along helical lines conforming to the helix of the thread 12.

It will be understood that the thread 12 may be a single thread or else a double thread (two threads extending in parallel relation, etc.).

In FIG. 5 a planar development of the inner periphery of the nut assemblage 14 is depicted, wherein a total of 8 roller elements is indicated. As shown, the roller elements may be staggered and provided in sets of four, or in other arrangements suited to the particular application, load-carrying capacity, etc.

Referring to FIG. 3, the roller element 28 is shown as carried by a radial-load roller bearing assemblage 48, by which it is turnable in the socket provided with a minimum amount of friction. Also, a thrust bearing assemblage 50 having rollers 51 is provided, for engagement with the outer end or head surface of the pin 28, thereby to take thrust forces on the pin with a minimum of friction. The thrust bearing 50 may be retained in place by a retainer sleeve 20 of the nut assemblage, or by any other suitable means. In place of the thrust bearing assemblage 50 shown in FIG. 3, an alternative thrust bearing assemblage comprising balls 52 in a cage 54 may be provided, for engagement with a pointer outer end portion 56 of a roller element or pin 58. Other types of anti-friction bearing devices may be provided, for mounting the load bearing pins 28–42, as will be understood. Those illustrated herein have been found to be especially advantageous for the purposes of the invention.

It will now be understood that the roller elements 30 are carried in the nut assemblage 14 so as to turn with a minimum amount of friction, that which does occur being mainly rolling friction involving the radial bearing assemblage 48 and the thrust bearing assemblage 50. The roller elements or pins 28–42 have a line contact with the side surfaces of the thread 12 and have a rolling type frictional engagement with such thread whereby there is reduced to the greatest possible extent frictional drag and inefficiency in the transmission of forces between the screw 10 and the nut assemblage 14.

In connection with the arrangement shown in FIGS. 4 and 5 it will be noted that eight of the roller elements are in engagement simultaneously with the thread 12, this being for a short length of the nut 14. For a longer length of nut, an additional set of four roller elements may be utilized, or multiple sets may be used. Depending on the nut length and the required load capacity, many additional sets of rollers may also be provided. The arrangement of FIGS. 4 and 5 depicts roller elements in two sets of four each. However, sets of five rollers, six rollers or seven rollers may similarly be utilized. Thus an appreciable increase in load capacity is possible by providing additional rollers in each set, and utilizing additional sets, the latter circumstance requiring a greater length of nut.

Referring to FIG. 3, the small taper in the cross section of the thread 12, and the small taper on the roller element or pin 28 results in a relatively light axial thrust being experienced by the pin, thereby lightening the load on the thrust bearing assemblage 50. This is of considerable advantage, and enables the transmission to handle relatively heavy loads.

With the arrangement of FIGS. 4 and 5, where the screw 10 has for example an outside diameter of 2½ inches, a nut which is 8 inches long and having 64 roller elements will handle a load of approximately 50 tons. The included angle between opposite walls of the thread 12 may advantageously be in the neighborhood of 3½° without involving excessive stresses on the thrust bearings 50 at the outer ends of the roller elements 28–42.

In FIG. 7 there is also illustrated an adjusting screw 60 to effect radial adjustment of the roller element 58.

Thus by suitably adjusting each of the elements or pins 58 in a nut, equalization of the loads on the pins may be effected, preventing any one pin or any group of pins from hogging the load and failing as a consequence.

FIG. 8 shows an adjustable transmission made in accordance with the invention. Parts similar to those already described have like characters. The pins 70 have grooves 72 accommodating split rings 74 which engage washers 76 in turn engaging the end thrust bearing assemblages 50. Adjusting screws 60a engage the bearing assemblages 48 and provide for axial adjustment of the pins 70.

It will now be understood that, in accordance with the invention and the foregoing, I have provided an improved light and heavy load transmission device having exceptionally low friction, and high efficiency, said transmission being relatively simple in construction and involving few components which are easily made. The transmission is small and compact, and may be economically fabricated. It especially fills the need for a device to efficiently handle loads greater than those which recirculating ball elements are capable of handling.

It should be understood that it is within the scope of the invention to form the screw thread in the nut element and to mount the rollers on a shaft passing through the nut member so that they project radially outwardly into the screw thread.

In the use of transmission mechanisms of the screw-and-nut type, it is not always possible to ensure that the loads are truly in line with the axis of the mechanism, and an off-set load, having a radial thrust component might adversely affect the load distribution between the rollers of a transmission mechanism according to the present invention, causing higher friction and rapid wear. Means are provided by the invention to support such radial thrust components, and FIGURES 9 and 10 of the drawings show examples of such means.

Figure 9:
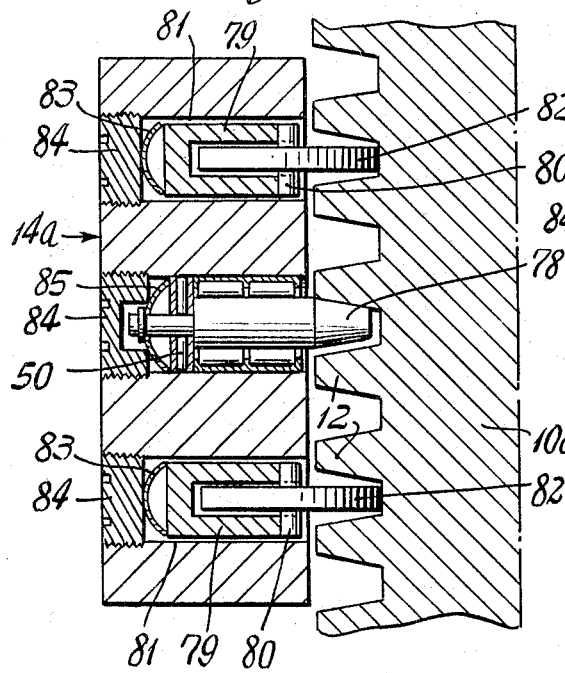
FIG. 9 is a fragmentary axial section of a screw and nut arrangement as provided by the invention, having means for supporting radial forces acting between the screw and nut.

Referring to FIGURE 9, there is illustrated a shaft 10a having a screw-thread 12a, and a nut element 14a carrying rollers, of which one is shown at 78, engaging the flank of the screw thread as previously described. The nut element 14a is also provided, adjacent each end, with plungers 79 slidable in radial sockets 81 in the nut element. Each plunger 79 has mounted for rotation about an axis 80 diametral to the said plunger a roller 82 adapted to enter between the turns of the screw thread 12a and engage the shaft element 10a between the said threads.

In accordance with the present invention, novel automatic means are provided to equalize the loads on the roller elements while at the same time eliminating the necessity for critical dimensions and tolerances of the roller-element carrying part. This means comprises spring carriers or spring control devices associated with the roller elements, said devices automatically adjusting the elements to substantially equalize the various loads sustained by the elements.

Before describing such means as applicable to the tapered roller elements, such as the elements 70 of FIG. 8, a somewhat similar means will be described as applied to the plungers 79 of FIG. 9.

The plungers 79 are urged radially inward by means comprising washer-type springs 83 taking their abutment on screw-threaded plugs 84 closing the outer ends of the sockets 81. By proper adjustment of the plugs 84 an equalization of the forces of the springs 83 may be effected, and/or a centralizing of the shaft 10a in the nut part 14a.

Coming now to the equalization of loads on the tapered roller elements, such as the elements 70 of FIG. 8 and elements 78 of FIG. 9, and additionally the eliminating of critical dimensions and tolerances of the part carrying the roller elements, it will be seen from FIG. 9 that the rollers 78 are urged radially inward by washer-type springs 85 acting on the thrust bearings 50, so that they are not only self-adjusting to take up wear but also enabled to equalize their loads with each other. The simple provision of such springs 85 thus is extremely important in preventing excessive loading and failure of any one roller element, this being possible due to the spring take-up provided by the springs 85, while additionally the exact precise placement of the roller elements 78 in the carrier 14a is not necessary. The taper of the elements 78 in conjunction with the springs 85 enable the elements to assume different adjusted radial locations, as will now be understood.

Figure 10:
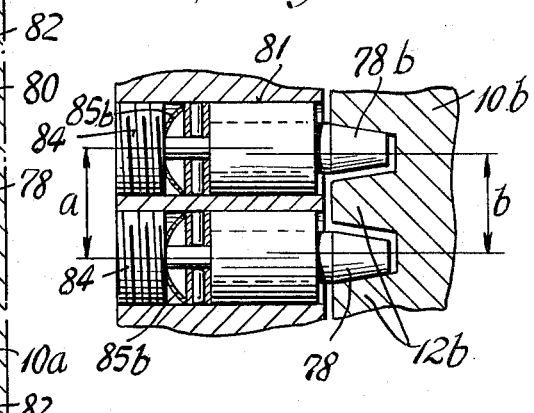
FIG. 10 is a fragmentary axial section similar to that of FIG. 9 but illustrating an automatic arrangement for taking up looseness or backlash.

The present invention also provides novel means to eliminate looseness or play between the screw and nut parts. Referring now to FIG. 10, the pitch of the screw-thread 12b on the shaft 10b and the longitudinal spacing of the rollers 78b forming pairs are so related that the said rollers 78b engage opposite flanks of the screw thread and any radial load due to offset loading of the mechanism exerts a thrust along the axes of the rollers due to the inclination of the screw-thread flanks and the tapered form of the rollers. The rollers 78b are likewise resiliently supported to resist this thrust, as by the spring washers 85b similar to the bowed spring washers 85 shown in FIG. 9. In FIG. 10, the distance between the centers of the thread troughs is indicated at b, and the axial spacing between the rollers at a, a being greater than b.

The preceding description relates to transmission mechanism of the screw-and-nut type, but the invention is also applicable to a mechanism comprising a sleeve, wheel hub or the like which is mounted on a shaft and turns or is turned by the shaft through a splined type of engagement. This is illustrated in FIGS. 11 and 12.

It is frequently required that the sleeve or wheel hub shall be able to slide freely axially on the shaft and to provide such free sliding movement, the features of the present invention can be embodied in such a mechanism. Referring to FIGURES 11 and 12, a splined shaft is shown at 86, and a surrounding sleeve, which is to rotate with and slide on the shaft, is shown at 87. Rollers 88 similar to the rollers 28 previously described with reference to FIGS. 3 and 4 are mounted in radial sockets in the sleeve 86 so as to project into the spaces between the splines on the shaft 86 and engage the side surfaces of the splines.

The rollers 88 are mounted in roller bearings 89 in the sockets, and are urged inwardly by washer-type springs 91 acting through thrust bearings 92. The angular spacing "A" between adjacent rollers 88 is slightly greater than the angular spacing "B" between the centers of adjacent spaces between the splines, so that the rollers engage opposite faces of the splines and there is no-rotational looseness or backlash in the mechanism, the springs 91 also taking up wear so as to maintain the no-backlash condition.

The present invention also provides a unique and advantageous transmission mechanism by which a large speed reduction is effected between an input shaft which rotates and an output structure which also rotates. Referring to FIGS. 13, 14 and 15, the said transmission mechanism comprises an input shaft 96 of appreciable length, having screw threads as shown. Encircling the shaft 96 is a nut member 98 which is provided with a plurality of roller elements 100 disposed in a helix corresponding to the pitch of the thread of the input shaft 96. The roller elements 100 are constituted in the same manner as the elements of the preceding figures, being carried by ball or roller bearing assemblages, both radial and thrust, and being spring-charged radially inward as by bowed spring washers.

It will be understood that turning of the input shaft 96 will cause axial movement of the nut member 98.

The outside periphery of the nut member 98 also has helical grooves 102 and 104 of extremely large pitch, such grooves extending in opposite directions whereby they cross each other. As shown, the nut member 98 has a plurality of helical grooves 102 and a similar plurality of helical grooves 104. Surrounding the nut member 98 are three other nut members 106, 108 and 110. The nut members 106 and 110 have pluralities of roller elements 112 and 114 respectively, which follow the helices of the grooves 102. The nut member 108 has a plurality of roller elements 116 following the helices of the grooves 104.

Accordingly, it will be seen that axial or longitudinal movement of the nut member 98 will result in rotative movement of the outer nut members 106, 108 and 110. The nut members 106 and 110 will turn in one direction as indicated by the arrows, whereas the interposed nut member 108 will turn in the opposite direction.

It will also be understood that there is a great mechanical reduction between the input drive shaft 96 and the inner nut member 98, as well as a mechanical transmission reduction between the nut member 98 on the one hand, and the outer nut members 106, 108, and 110 on the other hand. Thus, a great mechanical advantage is had, enabling a small input torque applied to the shaft 96 to effect powerful turning movements of the outer nuts 106, 108 and 110.

Referring to FIG. 14, the interposed outer nut member 108 is provided with end flanges 118, and the outer two nut members 106 and 110 have end flanges 120, 122 respectively. Accordingly, the transmission device as seen in FIG. 14 may constitute a hinged actuator, whereby one structural part may be carried by the flanges 118 and a cooperable structural part may be carried by the flanges 120, 122. Such structural parts will accordingly be hingedly connected, and will be caused to swing with respect to one another in response to turning movement imparted to the input shaft 96.

A very powerful turning force is possible, as exerted between the flanges 118, 120 and 122, in response to a relatively small turning movement applied to the input shaft 96. Moreover, by virtue of the anti-friction mounting of the roller elements, frictional losses are held to an extremely small value whereby a high efficiency of the transmission is had. As seen in FIG. 14, the entire transmission may be wholly enclosed, with the inner nut member 98 travelling between end plates 123, 125 attached respectively to the ends of tubular housings 124, 126.

The roller elements 100 are spring charged, as by bowed spring washers like the washer 85 in FIG. 9, thereby to insure equalization of the loads on the roller elements.

It will be noted that the pitch of the threads 102, 104 is a large multiple of the outer diameter of the nut part 98, thereby to effectively turn the nut parts 106, 108 and 110 in response to longitudinal movement of the nut part 98.

As will be seen from the above description, the invention provides a load transmission mechanism capable of dealing with either light or heavy loads, which is simple in construction and of high efficiency. The said transmission mechanism is small and compact, and can be economically manufactured. It is particularly useful for applications of the type for which recirculating ball screws are used but which the loads are greater than can be handled by such devices.

Variations and modifications may be made within the scope of the claims, and portions of the improvement may be used without others.

I claim:

1. An anti-friction transmission mechanism engageable and cooperable with projections of a shouldered part, comprising in combination:
   (a) a support member having an annular portion adapted to extend along the projections of said part in spaced relation thereto,
   (b) a plurality of roller elements carried by and projecting from the annular portion of the support member and arranged for engagement and line contact with side surfaces of the projections of said part, and
   (c) anti-friction bearing devices disposed between said roller elements and annular portion of the support member, mounting the elements thereon in substantially radial disposition with respect to said annular portion,
   (d) the projecting portions of the roller elements tapering to a small end diameter, and
   (e) spring means yieldably urging said roller elements outwardly of the annular portion of the support member.

2. A mechanism as defined in claim 1, in combination with:
   (a) a shouldered part having sloping shoulder faces engaged with the tapered portions of the roller elements,
   (b) said spring means tending to wedge the roller elements snugly against said sloping shoulder faces at all times.

3. The invention as in claim 2, wherein:
   (a) means are provided, for adjusting said spring means to regulate the tension thereof on the roller elements.

4. The invention as in claim 2, wherein:
   (a) the shouldered part has a pair of sloping shoulder faces disposed in opposite relation to each other,
   (b) some of said roller elements engaging one of said faces and other roller elements engaging the other of said faces.

5. The invention as in claim 4, wherein:
   (a) the shoulder faces extend longitudinally of the shouldered part and constitute sides of straight splines of said part.

6. The invention as in claim 5, wherein:
   (a) screw means are provided, for adjusting the tension of said spring washers.

7. The invention as in claim 2, wherein:
   (a) the roller elements comprise turnable pins,
   (b) said spring means comprising bowed spring washers for applying end forces to said roller elements.

8. The invention as in claim 7, wherein:
   (a) anti-friction thrust bearings are provided, interposed between the spring washers and roller elements.

9. The invention as in claim 2, wherein:
   (a) additional anti-friction roller elements are provided, carried by the nut and engaging the bottoms of the threads, to center the screw in the nut.

10. The invention as in claim 9, wherein:
    (a) spring means are provided, for yieldably urging the additional roller elements into engagement with the thread bottoms.

11. A transmission comprising:
    (a) a drive screw,
    (b) a nut member carried by said screw to travel along the same,
    (c) said nut member having a screw thread in its outer periphery, constituted with a large pitch which is a multiple of the nut outer diameter, and
    (d) a second nut member surrounding the first-mentioned nut member and having teeth engaged with said large-pitch screw thread.

12. The invention as in claim 11, wherein:
    (a) a third nut member is provided, surrounding the first-mentioned nut member,
    (b) said first-mentioned nut member having an additional screw-thread of large pitch and opposite helix angle,
    (c) said third nut member having teeth engaged with the additional screw thread of large pitch whereby the second and third nut members have opposite rotation in response to axial movement of the first-mentioned nut member.

13. The invention as in claim 12, wherein:
    (a) the teeth of the said nut members comprise roller elements,
    (b) anti-friction bearings, rotatably carrying said roller elements in said nut members.

14. The invention as in claim 13, wherein:
    (a) the threads of the screw and first-mentioned nut member have sloping side surfaces,
    (b) said roller elements having tapered portions engaging the sloping side surfaces of said threads,
    (c) spring means yieldably urging the roller elements into engagement with said threads, thereby to equalize the loads on said elements.

15. The invention as in claim 12, wherein:
    (a) a fourth nut member is provided, surrounding the first-mentioned nut member and having teeth engaging the said additional screw thread of large pitch,
    (b) said second nut member being interposed between said third and fourth nut members, and the latter two nut members turning in the same directions.

16. The invention as in claim 15, wherein:
    (a) casings are provided, enclosing those portions of the first-mentioned nut member which project from the other nut members, and enclosing portions of the said screw traveled by the first-mentioned nut member.

17. An anti-friction transmission mechanism engageable and cooperable with projections of a shouldered part, comprising, in combination:
    (a) a support member having an annular portion adapted to extend along the projections of said part in spaced relation thereto,
    (b) a plurality of roller elements carried by and projecting from the annular portion of the support member and arranged for engagement and line contact with side surfaces of the projections of said part, and
    (c) anti-friction bearing devices disposed between said roller elements and annular portion of the support member, mounting the elements thereon in substantially radial disposition with respect to said annular portion,
    (d) said support member comprising an annulus,
    (e) said annular portion of the support member comprising the inside of said annulus,
    (f) said roller elements projecting inward from said annular portion,
    (g) the said annulus being constituted of a plurality of segments, and
    (h) means securing the segments in assembled relation.

18. The invention as in claim 17, wherein:
(a) the annulus has substantially radially disposed sockets extending between its inner and outer peripheries,
(b) said roller elements comprising headed pins carried in the sockets and extending inward past the inner periphery of the annulus with the head portions located at the outer periphery of the annulus,
(c) said head portions preventing inward movement of the pins from the sockets, and
(d) means engaging the head portions of the pins and including a sleeve on the outer periphery of the annulus, blocking the pins against outward movement whereby they are retained in the said sockets.

19. An anti-friction transmission mechanism engageable and cooperable with projections of a shouldered part, comprising in combination:
(a) a support member having an annular portion adapted to extend along the projections of said part in spaced relation thereto,
(b) a plurality of roller elements carried by and projecting from the annular portion of the support member and arranged for engagement and line contact with side surfaces of the projections of said part, and
(c) anti-friction bearing devices disposed between said roller elements and annular portion of the support member, mounting the elements thereon in substantially radial disposition with respect to said annular portion,
(d) means for effecting positive radial adjustment of the roller elements.

20. The invention as in claim 19 wherein:
(a) the annular portion of the support member has sockets in which the roller elements and bearing devices are carried,
(b) means comprising screws threaded into said sockets, are provided for effecting radial adjustment of the roller elements.

References Cited by the Examiner

UNITED STATES PATENTS

| 2,063,787 | 12/1936 | Brown | 308—174 |
| 3,169,407 | 2/1965 | Newell | 74—424.8 |

FOREIGN PATENTS

| 470,222 | 8/1914 | France. |
| 526,586 | 7/1921 | France. |
| 201,925 | 9/1908 | Germany. |
| 1,044 | 1/1906 | Great Britain. |

DAVID J. WILLIAMOWSKY, *Primary Examiner.*

L. H. GERIN, *Assistant Examiner.*